Oct. 19, 1965  R. W. ANTHONY  3,212,374
EXPANDING ARBOR
Filed Aug. 29, 1962
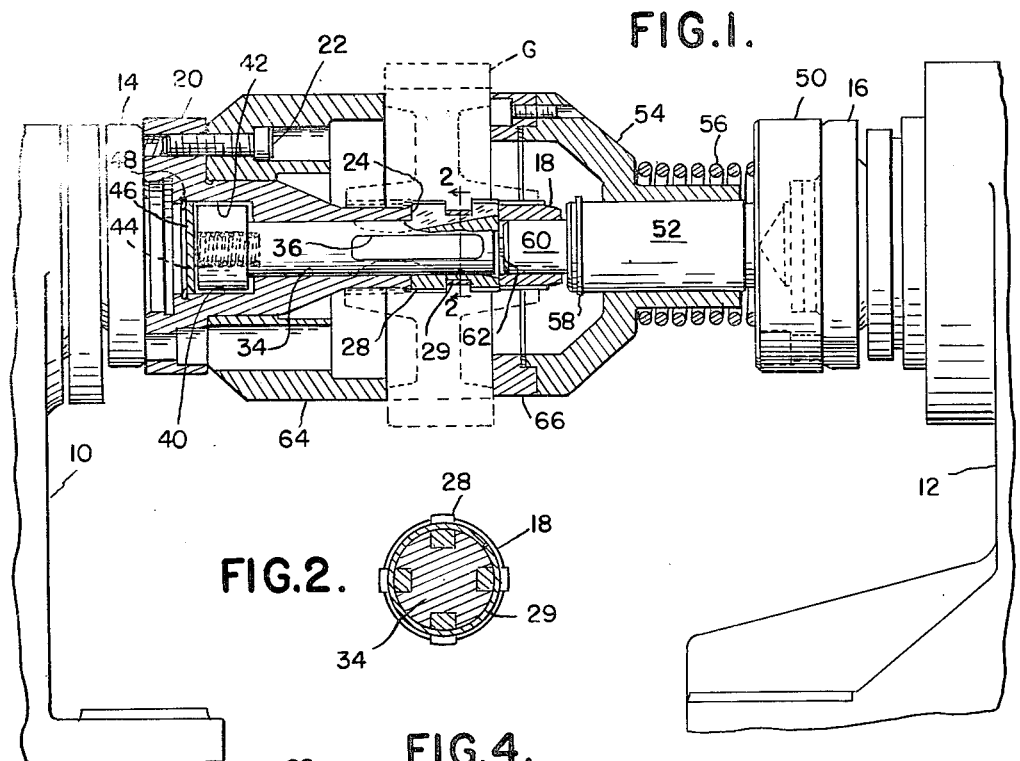
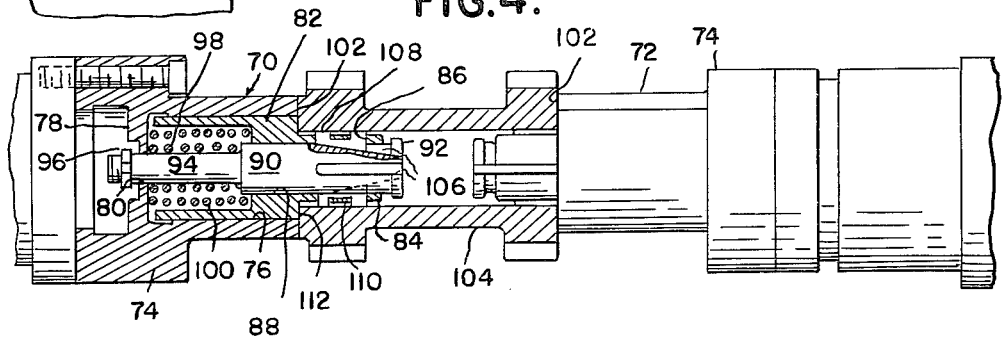
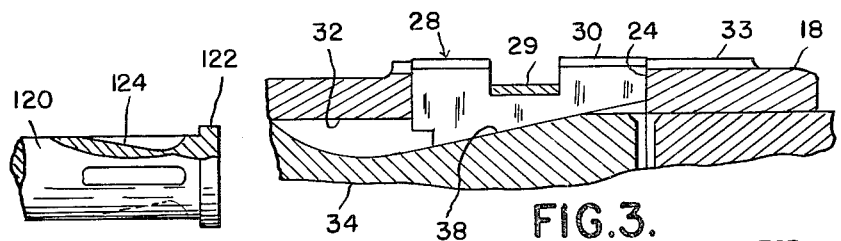
INVENTOR.
RUSSEL W. ANTHONY

United States Patent Office 3,212,374
Patented Oct. 19, 1965

3,212,374
EXPANDING ARBOR
Russel W. Anthony, Detroit, Mich., assignor to National Broach & Machine Company, Detroit, Mich., a corporation of Michigan
Filed Aug. 29, 1962, Ser. No. 220,165
2 Claims. (Cl. 82—44)

The present invention relates to an expanding arbor.

It is an object of the present invention to provide an expanding arbor provided with a plurality of radially movable keys and cam means for moving the keys uniformly radially to engage, locate and firmly support a workpiece.

It is a further object of the present invention to provide an expanding arbor including stocks relatively movable in approach and separation, an arbor connected to one of the stocks comprising a tubular sleeve having radial openings therein, a cylindrical camming element axially movable in said sleeve, said camming element having a plurality of circumferentially spaced axially extending grooves therein, said grooves having inclined camming bottom surfaces, and individually movable keys or wedges received in said grooves and extending through the openings in said sleeve.

It is a further object of the present invention to provide an expanding arbor as described in the preceding paragraph in which said arbor includes cooperating locating means engageable with opposite sides of a flat-side workpiece adapted to be supported on said arbor.

It is a further object of the present invention to provide an arbor as defined in the second paragraph above which comprises means on the other of said stocks cooperating with the sleeve and camming element on said one stock to effect axial movement of said camming element upon relative approach between said stocks.

It is a further object of the present invention to provide an expanding arbor including radially movable keys or wedges in which the radial force exerted by said keys or wedges is independent of the force causing approach between the head and tailstock of which said expanding arbor is a part.

It is a further object of the present invention to provide an expanding arbor including a tubular member having elongated slots adjacent to but spaced from one end thereof, a camming element relatively longitudinally movable in said tubular member, said camming element including radially inwardly extending grooves adjacent to but spaced slightly from an end thereof, said grooves having inclined camming bottom surfaces, and keys or wedges extending through said elongated slots into said grooves.

Other objects and features of the invention will become apparaent as the description proceeds, especially when taken in conjunction with the accompanying drawings, illustrating preferred embodiments of the invention, wherein:

FIGURE 1 is a longitudinal sectional view through an expanding arbor constructed in accordance with the present invention.

FIGURE 2 is an enlarged section on the line 2—2, FIGURE 1.

FIGURE 3 is a further enlarged fragmentary sectional view illustrating a detail of construction.

FIGURE 4 is a longitudinal view, partly in section, illustrating a second embodiment of the present invention.

FIGURE 5 is a fragmentary eleventional sectional view, partly in section, of a modified camming element suitable for use in the construction of FIGURE 4.

Referring first to FIGURES 1-3 there is illustrated a headstock 10 and a tailstock 12 including rotary spindles, parts of which are seen at 14 and 16 respectively.

The expanding arbor which is adapted to mount a workpiece herein designated as a gear G shown in phantom, comprises a tubular arbor 18 including a flange 20 by means of which it is secured to the spindle 14 of the headstock by screws as shown in FIGURE 1. The tubular arbor 18 is provided adjacent its free end with a plurality of axially extending narrow slots 24 having parallel flat sides adapted to receive and guidingly support keys or wedges 28. The plurality of keys or wedges 28 are retained in the slots by a garter spring 29 which is expansible to permit radial outward movement of the keys or wedges 28. This construction is most clearly seen in enlarged FIGURE 3 where the keys 28 are shown in this instance as including axially extending ribs or serrations 30 designed to interfit correspondingly shaped ridges or serrations or splines provided on the interior surfaces of the opening through the workpiece G. The end or nose portion of the tubular arbor 18 is also provided with the longitudinally extending ribs, splines or serrations, as indicated at 33. In practice, the keys or wedges 28 are located in slots 24 in the arbor and the serrations or splines are ground both in the arbor and in the keys or wedges at the same time.

Slidably received within the elongated cylindrical opening 32 of the tubular arbor 18 is a camming element 34 having a plurality of grooves 36 the bottom surfaces 38 of which, as best illustrated in FIGURE 3, are inclined to form camming surfaces. The bottom surfaces of the keys or wedges 28 are correspondingly inclined and engage the inclined camming surfaces 38 as best illustrated in FIGURE 3. It will be observed that the grooves or slots 36 terminate short of the end of the camming element 34 so that at its right hand end, as seen in FIGURE 1, the camming element has a complete cylindrical configuration.

At its other end the camming element 34 is provided with a head 40 received in an enlarged chamber 42 formed in the tubular arbor 18. The head 40 of the camming element 34 is recessed to receive a compression spring 44 which seats against a plate 46 retained in the chamber 42 by a split ring 48. With this arrangement it will be observed that the camming element 34 is mounted for limited axial movement, the extent of movement being determined to the left in FIGURE 1 by engagement between the head 40 and the plate 46, and being determined to the right as seen in FIGURE 1, by engagement between the head 40 and the right hand end of the enlarged chamber 42. It will further be observed that movement of the camming element 34 to the right, as seen in FIGURE 1, permits radially inward movement of the wedges or keys 28.

Suitably secured to the spindle 16 of the tailstock is a member 50 having a reduced portion 52 on which is slidably received a locating sleeve 54, the sleeve 54 being urged to the left by a compression spring 56, and movement of the sleeve to the left being limited by engagement with a split ring 58. The left hand end of the member 50 as seen in FIGURE 1, is further reduced as indicated at 60 and terminates in a still further reduced cam engaging portion 62. The small end extending portion 62 is engageable with the right hand end of the camming element 34 when the reduced portion 60 of the member 50 enters the cylindrical opening in the right hand end of the arbor 18. Engagement between the portion 62 and the camming element 34 moves the camming element to the left as seen in FIGURE 1 against the force of the compression spring 44, thus camming the keys or wedges 28 radially outwardly into engagement with the inner surface of the workpiece G.

Carried by the headstock 10, connected to flange 20 by screws 22, and surrounding the arbor 18 is a locating sleeve 64 which cooperates with a locating ring 66 carried by the sleeve 54 to partially locate the workpiece G prior to its final location by radial outward movement of the keys or wedges 28.

In operation the work gear G is placed on the arbor 18 while the tailstock 12 is separated substantially from the arbor 18. At this time the camming element 34 is retained to the right by the spring 44 and the keys or wedges 28 are retained radially inwardly by the garter spring 29. The work gear G is at this time relatively loose on the arbor 18 and may or may not be in engagement with the locating sleeve 64. At this time the tailstock 12 is advanced to the left as seen in FIGURE 1, and the reduced piloting portion 60 of the member 50 enters the cylindrical opening in the arbor 18. Prior to engagement between the reduced end portion 62 thereof and the adjacent end of the camming element 34, the locating ring 66 engages a flat side of the gear G and brings it into firm located engagement with the locating sleeve or collar 64. This squares the gear G with reference to the axis of the spindles but does not of course insure its accurate radial location. It is retained in this partially located position by compression of the spring 56.

Further movement of the tailstock 12 to the left eventually brings about engagement between the portion 62 and the end of the camming element 34. Additional movement of the tailstock results in shifting the camming element 34 to the left which results in simultaneous outward camming movement by equal increments of all of the individually movable keys or wedges 28. These are thus actuated to shift the gear G. radially to the correct axial alignment with the spindles and to bring about firm supporting, and if necessary, driving engagement between the keys or wedges 28 and the work gear G.

The keys or wedges 28 are flat-sided elongated elements and are received and accurately guided for radial movement in the interfitting slots 24 formed in the arbor 18 and grooves 36 formed in the camming element 34. It will be apparent that reception of the keys in the grooves 36 retain the grooves in proper alignment with the slots 24.

Referring now to FIGURE 4 there is illustrated a modified form of the invention. In the embodiment illustrated in FIGURES 1–3 it will of course be observed that the radially outwardly acting force applied by the keys or wedges 28 to the interior of the work gear G is determined by the force applied to advance the tailstock 12. In some cases where accurate control of the force advancing the tailstock is not available, it may be preferable to provide for controlling the outward force applied by the keys or wedges by springs whose effectiveness may be predetermined. In FIGURE 4 there is shown a pair of arbor assemblies 70 and 72 which may be identical. The arbor assembly 70 is shown in section and further reference will be to this arbor assembly. Arbor assembly 70 comprises a mounting and housing member 74 having a cylindrical opening 76 therein terminating at its inner end in a wall 78 having a reduced opening 80 extending therethrough. Slidably received in the housing member 74 is the arbor 82 having a reduced portion 84 provided with a plurality of parallel sided radially extending guide slots 86 corresponding in all respects to the guide slots 24 provided in the arbor 18. The arbor 82 is provided with a cylindrical opening 88 which receives a longitudinally slidable camming element 90 having at its inner end a slightly enlarged head 92 and having at its outer end a reduced portion 94 extending through the opening 80. The camming element 90 is retained in assembled position by a nut 96 and is urged to the right as seen in FIGURE 4 by a compression spring 98. A second compression spring 100 is provided urging the arbor 82 to the right as seen in FIGURE 4.

The housing member 74 includes an annular mounting surface 102 adapted to be engaged by one side of a workpiece such as the gear indicated in this figure at 104.

The camming element 90 is provided with a plurality of grooves 106. Extending through the slots or elongated openings 86 provided in the reduced portion 84 of the arbor 82 and engaging the inclined bottom camming surfaces of the grooves 106, are keys or wedges 108 retained in assembled position by an expansible garter spring 110.

With the arrangement above described it will be observed that if the arbor assembly 72 is withdrawn to the right, a work gear 104 may be placed on the reduced portion 84 of the arbor 82, at which time it will be supported loosely thereon. Advance of the arbor assembly 72 by a corresponding advance of the tailstock causes the reduced portion 84 of the right hand arbor to enter the right hand end of the gear 104, and locating surface 102 of the housing member 74 will engage the right hand end of the gear and will move it into engagement with the locating surface 102 of the left hand housing member 74. Prior to engagement between the left hand end of the gear 104 and the locating surface 102 of the left hand housing member 74, the left hand end of the gear 104 will engage a shoulder 112 on the left hand arbor 82, which at this time will have moved to the right by the spring 100 into engagement with the radial flange or enlargement 92 on the inner end of the camming element 90. As the tailstock moves to the left the arbor 82 is moved to the left, thus permitting relative movement of the camming element 90 to the right under the influence of the spring 98. Movement of the camming element 90 to the right as seen in FIGURE 4 results in radial outward camming of the keys or wedges 108 and this action is energized by the spring 98 so that the radial force applied through the keys or wedges to the gear 104 is determined by selection of the spring 98. It will of course be apparent that a similar action takes place on the identical structure contained within the right hand housing so that the work gear 104 is first positioned squarely with the axis of the head and tailstock spindles and is thereafter shifted by the wedges or keys 108 into exact axial alignment therewith.

Referring now to FIGURE 5 there is illustrated a variation in the construction of the camming element 90. In FIGURE 5 the corresponding element is designated 120 and has a head 122 corresponding to the head 92 of the element 90. The camming element 120 differs from the element 90 principally in that the camming grooves 124 are located inwardly from the end of the camming element so that its inner end portion is of uninterrupted complete cylindrical configuration. In either case and in all embodiments of the present invention, the radially outwardly movable keys or wedges are accurately supported, guided and actuated by simultaneous engagement within radial slots extending through the tubular arbor and interfitting elongated camming grooves located in the camming element. With this arrangement the keys or wedges are located with particular accuracy and identical increments of radial outward movement are imparted thereto by axial movement of the camming element 34, 90 or 120.

The drawings and the foregoing specification constitute a description of the improved expanding arbor in such full, clear, concise and exact terms as to enable any person skilled in the art to practice the invention, the scope of which is indicated by the appended claims.

What I claim as my invention is:

1. Work support structure for mounting a cylindrical workpiece for machining the peripheral portion thereof comprising rotary axially aligned head and tailstocks relatively movable toward and away from each other between relatively separated loading positions and relatively adjacent working positions and adapted to grip the end surfaces of a cylindrical workpiece therebetween and to hold it against lateral displacement and in accurately centered relation when in working position, an elongated tubular arbor carried by one of said stocks having a free end extending toward the other stock and adapted to receive a workpiece thereon, said arbor having slots spaced inwardly from its free end opening radially thereinto and keys movable radially in said slots, said arbor being open at its free outer end and provided with an internal cylindrical support surface, an elongated wedge member movable axially in said arbor and spaced inwardly from the open free outer end thereof, resilient means urging said wedge member toward the open end of said tubular arbor, stop means acting between said wedge member and said arbor to limit outward movement of said wedge member, wedge actuating and arbor support means carried by said other stock including a rigid support portion movable into the open end of said tubular arbor to engage said support surface and to provide outboard support for the free end of said arbor, and an end portion movable into engagement with the outer end of said wedge member to move it inwardly of said arbor in wedging relation to said keys.

2. Work support structure for mounting a cylindrical workpiece for machining the peripheral portion thereof comprising rotary axially aligned head and tailstocks relatively movable toward and away from each other between relatively separated loading positions and relatively adjacent working positions and adapted to grip the end surfaces of a cylindrical workpiece therebetween and to hold it against lateral displacement and in accurately centered relation when in working position, an elongated tubular arbor carried by one of said stocks having a free end extending toward the other stock and adapted to receive a workpiece thereon, said arbor having slots spaced inwardly from its free end opening radially thereinto and keys movable radially in said slots, said arbor being open at its free outer end and provided with an internal cylindrical support surface, an elongated wedge member movable axially in said arbor and spaced inwardly from the open free outer end thereof, resilient means urging said wedge member toward the open end of said tubular arbor, stop means acting between said wedge member and said arbor to limit outward movement of said wedge member, wedge actuating and arbor support means carried by said other stock including a rigid support portion movable into the open end of said tubular arbor to engage said support surface and to provide outboard support for the free end of said arbor, an end portion movable into engagement with the outer end of said wedge member to move it inwardly of said arbor in wedging relation to said keys, lateral support means on said stocks to grip the sides of a workpiece adjacent the periphery thereof, said lateral support means comprising an annular member rigidly carried by one of said stocks and having an annular surface engageable with one side of a workpiece adjacent its periphery, a second annular member having an annular surface engageable with the other side of a workpiece adjacent its periphery and carried by said other stock and movable axially thereon, resilient means connected between said other stock and said second annular member urging it toward said other arbor but yieldable upon engagement with a workpiece to hold it in accurately located axial position and thus provide lateral support therefor while permitting radial shifting thereof as said keys are wedged radially outwardly.

References Cited by the Examiner
UNITED STATES PATENTS

| | | | |
|---|---|---|---|
| 1,522,770 | 1/25 | Dustan | 82—44 X |
| 1,944,255 | 1/34 | McFall et al. | 82—44 X |
| 1,946,429 | 2/34 | Smith et al. | 82—2.7 |
| 2,249,148 | 7/41 | Lovely et al. | 82—44 X |
| 2,332,576 | 10/43 | Iverson et al. | 279—2 X |
| 2,698,551 | 1/55 | Olsen | 279—2 X |
| 2,808,753 | 10/57 | Brown | 82—44 |

WILLIAM W. DYER, Jr., *Primary Examiner.*